April 26, 1966 J. DASCOTTE 3,248,695

ERROR DETECTING SYSTEM

Filed Oct. 9, 1962

Inventor
JEAN DASCOTTE
By [signature]
Attorney

United States Patent Office 3,248,695
Patented Apr. 26, 1966

3,248,695
ERROR DETECTING SYSTEM

Jean Dascotte, Boulogne-Billancourt, France, assignor to International Standard-Electric Corporation, New York, N.Y., a corporation of Delaware Filed Oct. 9, 1962, Ser. No. 229,396
Claims priority, application France, Oct. 19, 1961, 876,447, Patent 1,310,678
20 Claims. (Cl. 340—146.1)

Figure 1:
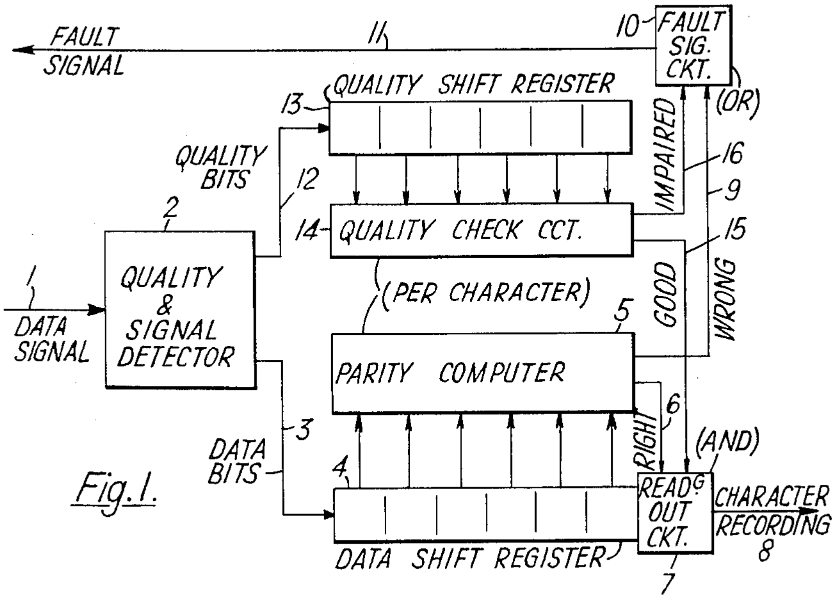

The present invention relates to data transmission systems and more particularly to error detecting systems for data transmissions systems wherein data are transmitted according to the binary mode.

Error detecting systems are known wherein the binary bits are arranged in groups of blocks of great size to permit error detection. Such systems require that data be transmitted by large groups of binary bits. Error detecting systems are also known wherein the bits are arranged in small groups, for instance code characters, and these small groups are transmitted with a predetermined redundancy. Such systems operate at the cost of time by increasing twofold or even fourfold the duration of transmissions.

The transmission of various and fast information on a network, such as a seat reservation system network, is particularly considered in the present invention. In this type of transmission system, information is sometimes very short and it is important that the transmission be fast, to prevent the network line from being busy, that is, so that the network lines can rapidly handle the next transmission of information without undue delay. These two conditions exclude the use of error detecting systems of the two types set forth above.

Error detecting systems are also known wherein the bits are arranged in small groups, for instance 5 to 8 bit characters, and parity bits are added to these characters. Such systems are simple ones and adapted to the type of transmission system considered in this specification. However, if this type of error detecting system is effective for detecting separate errors, it loses its efficiency when the errors occur in bursts. In this situation, the bits have their identity changed in each character and the parity bits have as much chance to screen errors as to detect them. Transmission trials have shown that, in case of disturbances in the transmission, the errors mainly occur in bursts of the same order of length as the characters, that is, about ten bits.

Therefore, an object of the present invention is to provide an error detecting system for a transmission system of the type set forth hereinabove which is simple and effective with regard to separate errors and burst of errors due to disturbances in the transmission.

A feature of the present invention is the provision of an error detecting system capable of operating on data signals including code characters of the parity check type comprising means to check the parity of each code character and produce a first output signal for each code character found to be correct, means to check a given characteristic, such as the amplitude of each bit of the code characters, representative of the quality of the bits and, hence, the transmission quality, and produce a second output signal for each of the code characters in which the given characteristic of all the bits thereof have met a predetermined standard and means responsive to the simultaneous presence of the two output signals to couple the code characters to a utilization device.

Another feature of the present invention is the provision of an error detecting system as described immediately above wherein the parity check means produces a first control signal having a first condition indicating no error and a second condition indicating error, and the quality check means produces a second control signal having a first condition representing no error and a second condition represneting poor quality of at least one bit in the character being checked. The means responsive responds to the simultaneous presence of the first condition of each control signal to pass the code character being checked to the utilization device and additional means respond to the presence of the second condition of either control signal to produce a fault signal.

Still another feature of the present invention is the provision of transmitting data by frequency shift techniques, that is, a "mark" (binary "1") is represented by a signal having a first frequency and a "space" (binary "0") is represented by a signal having a second frequency, frequency responsive means to convert the frequency shift signal into pulses, means to convert the thusly produced pulses into appropriate binary bits and means to check the amplitude of the produced pulses and produce an output signal for each character bit indicating whether the amplitude is of a suitable level, or if the amplitude is lower than a predetermined minimum or higher than a predetermined maximum. The binary bits produced in the means to convert are coupled to the abovementioned parity check means and the output signals of the means to check amplitude are coupled to the above-mentioned quality check means.

Figure 2:
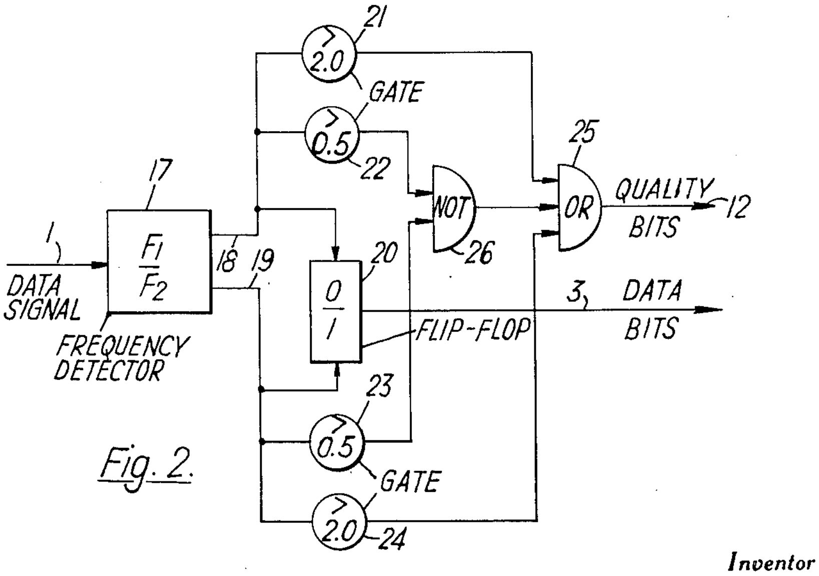

The above-mentioned and other features and objects of this invention will become more apparent by reference to the following description taken in conjunction with the accompanying drawings, in which:

FIG. 1 is a schematic diagram in block form of an error detecting system according to the principles of this invention; and FIG. 2 is a schematic diagram in block form of an embodiment of the quality and signal detector of FIG. 1.

Referring to FIG. 1, data signals are provided at 1, such as from the output of a detector of a radio receiver, and coupled to a quality and signal detector 2. Detector 2 detects each elementary signal which represents a binary bit, and also the quality of each elementary signal according to any suitable criterion, such as for instance the amplitude of the signal provided by detector 2 representing binary bits. An embodiment of detector 2 will be described hereinafter with respect to FIG. 2. The data bits are coupled from detector 2 along conductor 3 to the input of shift register 4. For the purpose of explanation, it is assumed that the data are transmitted in the form of six bit characters, and, therefore, register 4 is illustrated as comprising six sections. After each bit of a character is stored in its appropriate section of register 4, the parity of the code character is checked by parity computer 5. If the parity is right, computer 5 transmits a signal on conductor 6. This signal is applied to a reading out circuit 7 which, according to prior art arrangements, empties register 4 on an output conductor 8 connected to a utilization device, such as a data recording device. If the parity is wrong, computer 5 transmits a signal on conductor 9. This signal is applied to a fault signal circuit 10, and "OR" circuit. Circuit 10 transmits on conductor 11 a fault signal which is sent back to the transmitting station as an indication that the transmitting station should repeat the character found to be in error. This portion of the arrangement is well known.

For each data binary bit, detector 2 transmits on conductor 12 a quality binary bit. For instance, detector 2 transmits a "0" when the reception of the data binary bit is right and a "1" when the reception of said bit is wrong, according to the appropriate criterion. The quality binary bits are introduced in a shift register 13 similar to register 4. Register 13 is associated with a quality check circuit 14 which checks, after the recording of each bit of a character, if there is one bit of faulty quality (for instance a "1") recorded in a section of register 13. If there is none, that is, if the reception of all the data bits is right, circuit 14 provides on conductor 15 a single signal representing good quality of all the bits of the code character which is applied to reading out circuit 7 which, according to the principles of this invention, is a coincidence or "AND" circuit rather than a trigger or gate (switch) circuit of the prior art arrangement. Circuit 7 receives the signal on conductor 6 (right parity) and the signal on conductor 15 (good quality) and empties register 4 on conductor 8 if the two signals are simultaneously present. If there is at least one bit of faulty quality in register 13, circuit 14 provides on conductor 16 a signal representing imparied quality. This signal is applied to fault signal circuit 10 to provide a fault signal on conductor 11. Since circuit 10 is an "OR" circuit a fault signal will be generated if a signal is present on either of the conductors 9 or 16.

The arrangement comprises, of course, synchronizing system for the bits and the characters, as is well known in the art, an arrangement to empty register 13 after each character when circuit 14 has transmitted a signal on conductor 15 or 16 and an arrangement to empty register 4 after each character that causes computer 5 to transmit a signal on conductor 9.

Referring to FIG. 2, an embodiment of detector 2 is illustrated as comprising detector 17 of the frequency responsive type including two circuits, each circuit responding to a particular signal representing a given binary condition, that is, a "mark" (binary "1") or a "space" (binary "0"). Such detectors are utilized more particularly in frequency shift type transmission systems. It is assumed for purposes of explanation that one circuit of detector 17 responds to frequency $F_1$ to provide a pulse representing a "space" (binary "0") and that the other circuit of detector 17 responds to frequency $F_2$ to provide a pulse representing a "mark" (binary "1"). The respective pulses are provided at the outputs 18 and 19 and applied to flip-flop 20. Flip-flop 20 converts the pulses at the output 18 into a binary "0" (no pulse) and the pulse at the output 19 into a binary "1" (a pulse). This portion of detector 2 is well known in the art.

The following criterion will be assumed for the reception quality check. During normal operation (without error) detector 17 provides a pulse representing a binary bit from either output 18 or output 19. This output pulse normally has an amplitude of unity. The other output does not carry any signal, that is, it is at an amplitude near zero. Flip-flop 20 changes the amplitude of the signal on outputs 18 and 19 or retains its amplitude depending upon whether the preceding signal was of the opposite amplitude or of the same amplitude. The criterion assumed here is that the reception is wrong when the pulses at the outputs 18 and 19 have an amplitude less than 0.5 (weak reception and questionable binary condition) and also when the pulses have an amplitude greater than 2.0 (reception impaired by a strong interference.) Gates 21, 22, 23, and 24 are, therefore, coupled to outputs 18 and 19 as illustrated, gates 21 and 24 providing an output if the pulses from detector 17 are greater than 2.0 and gates 22 and 23 broviding an output if the pulses from detector 17 are less than 0.5. Since it was assumed hereinabove that wrong reception was indicated by a binary "1" the output from gates 21 and 24 are coupled directly to "OR" gate 25 and, hence, to conductor 12. However, no output (binary "0") from gates 22 and 23 represents bad quality or wrong reception. Thus, to be consistent with the criterion that a binary "1" represents wrong reception, gates 22 and 23 are coupled to "NOT" circuit 26 which inverts the output of gates 22 and 23 to satisfy the wrong reception criterion. The output of circuit 26 is coupled to "OR" gate 25 and, hence, to conductor 12.

It will be understood that any equivalent arrangement could be utilized, or any other arrangement according to the particular criterion chosen. The application of pulses representing data bits to flip-flop 20, or the delivery of digital bits by flip-flop 20 could be controlled, but this does not seem necessary, as it is not known, for instance, if the fault would be to apply a wrong quality bit rather than not to apply it. In either case, the character which includes a wrong quality bit will be refused.

While I have described above the principles of my invention in connection with specific apparatus, it is to be clearly understood that this description is made only by way of example and not as a limitation to the scope of my invention as set forth in the objects thereof and in the accompanying claims.

I claim:

1. An error detecting system for data transmission systems comprising:
- a source of data signal including code characters of the parity check type;
- first means coupled to said source to check the parity of said characters and produce a first output signal for each of said characters found to be correct;
- second means coupled to said source to check a given characteristic of each bit of said characters representative of the quality thereof and produce a second output signal for each of said characters in which said given characteristic of all the bits thereof have met a predetermined standard; and
- third means coupled to said first and second means responsive to the simultaneous presence of said first and second output signals to couple said code characters therethrough to a utilization device.

2. A detecting system according to claim 1, wherein said third means includes a coincidence device.

3. A detecting system according to claim 1, wherein said first means includes:
- a shift register coupled to said source to store one of said characters at a time; and
- a parity check circuit coupled to said shift register to produce said first output signal.

4. A detecting system according to claim 3, wherein said third means is coupled to the read-out terminal of said shift register and the output of said parity check circuit.

5. A detecting system according to claim 4, wherein said third means includes an "AND" circuit.

6. A detecting system according to claim 1, wherein said second means includes:
- a first shift register coupled to said source to store information indicative of the quality of the bits of one of said characters at a time; and
- a circuit coupled to said first shift register to check the information stored therein to produce said second output signal.

7. A detecting system according to claim 6, wherein said first means includes:
- a second shift register coupled to said source to store one of said characters at a time; and
- a parity check circuit coupled to said second shift register to produce said first output signal.

8. A detecting system according to claim 7, wherein said third means includes:
- a coincidence circuit coupled to the read-out terminal of said second shift register, the output of said parity check circuit and the output of said check circuit coupled to said first shift register.

9. A detecting system according to claim 1, wherein said given characteristic is the amplitude of said bits.

10. A detecting system according to claim 1, wherein said given characteristic is the amplitude of said bits and said predetermined standard requires that said amplitude is greater than a predetermined minimum and less than a predetermined maximum.

11. A detecting system according to claim 1, wherein said data signal is in the form of a first signal having a first frequency representing a "mark" and a second signal having a second frequency representing a "space," and said detecting system further includes:
- frequency responsive means to convert said first and second signals to pulses;
- means coupled to said frequency responsive means to convert said pulses into corresponding digital bits; and
- means coupled to said frequency responsive means to produce an output signal having a first condition when said pulses have an amplitude between a given minimum and a given maximum amplitude and a second condition when said pulses have an amplitude less than said minimum amplitude and greater than said maximum amplitude.

12. An error detecting system for data transmission systems comprising:
- a source of data signal including code characters of the parity check type;
- first means coupled to said source to check the parity of each of said characters and produce a first control signal having a first condition indicating an error and a second condition indicating the absence of an error in each of said characters;
- second means coupled to said source to check a given characteristic of each bit in each of said characters representative of the quality thereof and produce a second control signal having a first condition indicating good quality of the bits of each of said characters and a second condition indicating impaired quality of at least one bit of each of said characters;
- third means coupled to said first means and said second means responsive to the simultaneous presence of said first condition of said first and second control signals to pass said characters therethrough to a utilization device; and
- fourth means coupled to said first means and said second means responsive to said second condition of either of said first and second control signal to produce a fault signal.

13. A detecting system according to claim 12, wherein said third means includes a coincidence device.

14. A detecting system according to claim 12, wherein said fourth means includes an "OR" circuit.

15. A detecting system according to claim 12, wherein said first means includes:
- a shift register coupled to said source to store one of said characters at a time; and
- a parity check circuit coupled to said shift register to produce said first control signal.

16. A detecting system according to claim 12, wherein said second means includes:
- a first shift register coupled to said source to store information indicative of the quality of said given characteristic of the bits of one of said characters at a time; and
- a circuit coupled to said first shift register to check said information stored in said first register to produce said second control signal.

17. A detecting system according to claim 16, wherein said first means includes:
- a second shift register coupled to said source to store one of said characters at a time; and
- a parity check circuit coupled to said second shift register to produce said first control signal.

18. A detecting system according to claim 17, wherein said third means includes a coincidence circuit coupled to the read-out terminal of said second shift register, the output of said parity check circuit and the output of said check circuit coupled to said first shift register; and said fourth means includes an "OR" circuit coupled to the output of said parity check circuit and the output of said check circuit coupled to said first shift register.

19. A detecting system according to claim 12, wherein said given characteristic is the amplitude of said bits and the first condition of said second control signal is produced when said amplitude is greater than a predetermined minimum and less than a predetermined maximum and said second condition of said second control signal is produced when said amplitude is less than said predetermined minimum and greater than said predetermined maximum.

20. A detecting system according to claim 12, wherein said data signal is in the form of a first signal having a first frequency representing a "mark" and a second signal having a second frequency representing a "space," and said detecting system further includes:
- frequency responsive means to convert said first and second signals to pulses;
- means coupled to said frequency responsive means to convert said pulses into corresponding digital bits; and
- means coupled to said frequency responsive means to produce an output signal having a first condition when said pulses have an amplitude between a given minimum and a given maximum amplitude and a second condition when said pulses have an amplitude less than said minimum amplitude and greater than said maximum amplitude.

References Cited by the Examiner

UNITED STATES PATENTS

| | | | |
|---|---|---|---|
| 2,904,781 | 9/1959 | Katz | 340—146.1 |
| 2,956,124 | 10/1960 | Hagelbarger | 340—146.1 |

ROBERT C. BAILEY, *Primary Examiner.*

MALCOLM A. MORRISON, *Examiner.*

S. SIMON, T. M. ZIMMER, *Assistant Examiners.*